United States Patent [19]

Frankenfeld et al.

[11] Patent Number: 4,492,680

[45] Date of Patent: Jan. 8, 1985

[54] REMOVAL OF CADMIUM FROM ACIDIC PHOSPHATIC SOLUTIONS

[75] Inventors: Klaus Frankenfeld; Peter Ruschke, both of Budenheim; Peter Brodt, Idstein-Eschenhahn; Gerhard Eich, Ingelheim, all of Fed. Rep. of Germany

[73] Assignee: Chemische Fabrik Budenheim, Budenheim, Fed. Rep. of Germany

[21] Appl. No.: 495,653

[22] Filed: May 18, 1983

[30] Foreign Application Priority Data

May 18, 1982 [DE] Fed. Rep. of Germany ..... 32185995

[51] Int. Cl.$^3$ .......................... C01B 25/16; B03C 1/00; C01G 9/00
[52] U.S. Cl. ............................... 423/321 S; 423/100; 423/321 R
[58] Field of Search ................. 423/321 S, 321 R, 99, 423/100, 92

[56] References Cited

U.S. PATENT DOCUMENTS 3,258,307  6/1966  George .............................. 423/100
3,458,282  7/1969  Koerner et al. ................. 423/321 S

*Primary Examiner*—Gregory A. Heller
*Attorney, Agent, or Firm*—Schwartz, Jeffery, Schwaab, Mack, Blumenthal & Koch

[57] ABSTRACT

The invention is concerned with a process of removing cadmium from acid, especially $P_2O_5$-containing solutions by liquid/liquid extraction with the aid of alkyl amine salts that are dissolved in an inert, organic solvent. The cadmium ions are removed from the acid, aqueous phase and are enriched in the organic phase. The cadmium-containing organic phase, subsequently, is re-extracted with an aqueous salt solution, with the cadmium ions migrating from the organic phase into the aqueous phase. The process is particularly suitable for extracting cadmium from concentrated, highly acid aqueous solutions.

20 Claims, No Drawings

REMOVAL OF CADMIUM FROM ACIDIC PHOSPHATIC SOLUTIONS

BACKGROUND OF THE INVENTION

The present invention is concerned with a process of removing cadmium ions from aqueous, acid, especially $P_2O_5$ containing solutions by liqud-liquid extractions with the acid of alkyl amine salts of the halogen-hydracids that are dissolved in an inert organic solvent.

Cadmium is a heavy metal the spreading of which is to be reduced. Crude phosphate ores used for manufacturing phosphate-containing fertilizers, contain cadmium. By the digestion of the crude phosphates with acid, the cadmium, in the form of an easily soluble salt, is passed into the generated phosphoric acid, and in the further processing thereof into fertilizers. A certain amount of cadmium is thereby supplied to the soil. Through intensive fertilizing for years, the cadmium content in the soil increases. To prevent a further increase in the soil, it will be imperative to use only such fertilizers containing no or almost no heavy metal.

There are differences in the cadmium content of the individual crude phosphate ores and, hence, in the cadmium content of the phosphoric acids produced therefrom. Efforts have been taken to reduce the cadmium content in the crude phosphoric acids produced from crude phosphate ores of high cadmium content. However, considerable difficulties have been encountered with the removal of cadmium from a crude phosphate acid. Cadmium salts exhibit a very high solubility, especially in acids of higher concentration.

Cadmium, usually, is precipitated from weakly acid aqueous solutions by treatment with hydrogen sulfides, as an insoluble sulfide. According to the statements in Gmelin's Handbuch der organischen Chemie, System No. 9, part B, p. 100, cadmium can be precipitated as an insoluble sulfide, provided that the acidity of the solution does not exceed an HCl amount of 1.38 normal, i.e. that the ability of precipitating cadmium is limited to hydrochloric acid concentrations of up to 5%.

According to German Offenlegungsschrift No. 24 22 902 it is possible to precipitate from phosphoric acids of higher concentrations having a $P_2O_5$ content of in excess of 45 percent by weight, under a pressure of up to 50 atü (atmospheric excess pressure), and a dwelling time of up to 3 hours, cadmium from phosphoric acid. The examples show that a residual value of between 10 and 20%, based on the starting value of the cadmium, will remain in the acid. The process as disclosed by German Offenlegungsschrift No. 24 22 902 results in a reduction rather than in a removal of cadmium from the phosphoric acid. Apart from the unsatisfactory result of the described procedure, the process itself requires a high technical expenditure, as the reaction takes place in pressure vessels suitable for agitation.

Also, it is possible for cadmium to be removed from crude phosphoric acid by extraction with organic solvents. Technical possibilities for this are shown by the multiplicity of prior known processes for purifying phosphoric acid. In those processes pure phosphoric acid is recovered from which, in addition to cadmium also all other cations have been removed from the phosphoric acid. The acids in terms of purity are comparable with that of the thermal phosphoric acid. Owing to the high requirements placed upon quality, those processes are complex and very cost-intensive. The recovered pure acids for reasons of costs, in general, are not suitable for use in the manufacture of fertilizers. The object resides in providing a simple process permitting the removal from crude phosphoric acids of commercial concentrations or from other acid, especially $P_2O_5$ containing solutions the cadmium contained therein without substantially changing the quality level of the acid, i.e. the content of other cations. The process should permit, if possible, the selective removal of cadmium from the solutions to be treated.

SUMMARY OF THE INVENTION

The present invention is concerned with a process for removing cadmium ions from acid, especially $P_2O_5$-containing solutions by liquid-liquid extraction with the aid of organic compounds, which process is characterized in that the acid, especially $P_2O_5$ containing solution is placed into contact with an amine salt, dissolved in an organic solvent, that the aqueous, acid especially $P_2O_5$-containing solution is separated from the organic phase, and that the isolated organic cadmium ions containing phase is placed into contact with an aqueous solution so as to permit cadmium ions to be re-extracted from the aqueous phase.

Quite amazingly, it has been found that predetermined alkyl amine salts, dissolved in an organic solvent, are most suitable for the extraction of cadmium ions from acid, especially $P_2O_5$-containing solutions.

It was surprizing to the one skilled in the art to note that predetermined alkyl amine salts, dissolved in an organic solvent, are able to extract preferably only the cadmium ions from aqueous $P_2O_5$-containing solutions while other heavy metal cations will remain in the aqueous $P_2O_5$ solution.

DETAILED DESCRIPTION OF PREFERRED EMBODIMENTS

The organic solutions of the following salts have proved to be useful amine compounds for extracting the cadmium ions from acid, especially $P_2O_5$-containing solutions:

HCl salt
HBr salt
HI salt
HCN salt
HCNS salt

Particularly suitable are the amine salts of hydrochloric acid, hydrobromic acid and of hydroiodic acid.

The following Table shows the suitability of various amine salts by way of extraction tests on a phosphoric acid with 45% $P_2O_5$ and 105 ppm Cd.

The extraction is performed at the 1:1 phase ratio (parts by weight) with a 2% amine salt-xylol solution. The Cd-content in the phosphoric acid is determined prior to and after extraction.

Changes in the Cd-content by extraction

| Amine salt | Prior to Extr. ppm Cd | After Extr. ppm Cd. | % Depletion % of charge |
|---|---|---|---|
| (1) $H_3PO_4$ salt | 105 | 105 | 0 |
| (2) $(HPO_3)_n$ salt | 105 | 105 | 0 |
| (3) $H_2SO_4$ salt | 105 | 105 | 0 |
| (4) HF salt | 105 | 105 | 0 |
| (5) $H_2SiF_6$ salt | 105 | 100 | 5 |
| (6) HCl salt | 105 | 2 | 98 |
| (7) HBr salt | 105 | 2 | 98 |
| (8) HI salt | 105 | 3 | 97 |
| (9) HCN salt | 105 | 60 | 43 |
| (10) HCNS salt | 105 | 75 | 29 |

-continued

Changes in the Cd-content by extraction

| Amine salt | Prior to Extr. ppm Cd | After Extr. ppm Cd. | % Depletion % of charge |
| --- | --- | --- | --- |
| (11) $H_3BO_3$ salt | 105 | 105 | 0 |
| (12) acetate salt | 105 | 105 | 0 |

In the opinion of those skilled in the art, cadmium cannot be extracted from acid solutions by using organic compounds. It was, therefore, already amazing to the one skilled in the art to find that extraction of cadmium ions from acid solutions can be performed according to the process of the invention. However, what was particularly amazing was that the extraction of cadmium ions preferably takes place in a highly acid medium. It has thereby become possible for the first time to quantitatively remove cadmium ions from $P_2O_5$-containing acids of high concentrations.

The following Table shows the influence of the $P_2O_5$ concentration on the extractability of cadmium. The extractions were performed with pure phosphoric acids adjusted with $CdSO_4$ solution to a Cd concentration of approximately 100 ppm. The extractions were performed in one stage at a phase ratio of 1:1 (parts by weight) with an organic phase with 1.0% amine salt concentration.

Cd-Extractions from Phosphoric Acid in response to the $P_2O_5$ concentration

| Prior to Extraction | | After Extraction | |
| --- | --- | --- | --- |
| $P_2O_5$ (%) | Cd (ppm) | Cd (ppm) | Depletion (% of the charge) |
| 5 | 110 | 100 | 9 |
| 15 | 110 | 97 | 12 |
| 25 | 107 | 72 | 33 |
| 35 | 108 | 24 | 78 |
| 45 | 105 | 3 | 97 |
| 57 | 110 | 2 | 98 |

The concentration of the amine salt in the organic solvent equally has a strong influence on the extractability of cadmium from the acid $P_2O_5$-containing solutions. The example of phosphoric acids enriched with $CdSO_4$ solution will show the following distribution coefficients:

| Acid Concentration | Distribution Coefficient Amine salt concentration in the organic phase | | |
| --- | --- | --- | --- |
| % $P_2O_5$ | 0.5% | 1.0% | 2.0% |
| 5.0 | 0.02 | 0.10 | 0.38 |
| 15.0 | 0.02 | 0.13 | 0.57 |
| 25.0 | 0.03 | 0.49 | 2.96 |
| 35.0 | 0.66 | 3.50 | 20.60 |
| 45.0 | 6.00 | 34.00 | 51.50 |
| 57.0 | 35.70 | 54.00 | 54.00 |

The process of the invention is carried out with extraction media to be associated to the chemical substance category of the amine salts of the halogen-hydracid. The hydrogen halides of the primary, secondary and tertiary amines are suitable for extracting cadmium; however, the attainable degree of extraction in using primary, secondary and tertiary amine salts is different. The following Table shows the extraction behavior for cadmium from acids by the use of primary, secondary and tertiary isononyl amine salts of the hydrochloric acid under comparable test conditions. The comparing extraction tests were performed in one stage on a cadmium-doped phosphoric acid containing 45% $P_2O_5$ and having a cadmium content of 175 ppm with a xylol solvent phase of an excessive reagent concentration of 0.04 mol/liter at a phase ratio of 1:1 (parts by weight).

| Type of the amine salt | Change in the cadmium content in the phosphoric acid (45%) | |
| --- | --- | --- |
| | prior to extraction (ppm Cd) | after extraction (ppm Cd) |
| Primary isononyl-amine HCl salt | 175 | 40 |
| Secondary diisononyl-amine HCl salt | 175 | 11 |
| Tertiary triisononyl-amine HCl salt | 175 | 3 |

The salt of the tertiary amine has highest efficiency in the extraction of cadmium. It is already after one stage that cadmium is almost completely removed from the 45% phosphoric acid. Using the salts of the tertiary amine represents the preferred form of embodiment of the process of the invention.

Irrespective of the different extraction behavior of primary, secondary and tertiary amine salts over stoichiometrically deficient amounts of cadmium ions, all three types of amines are alike capable of forming a cadmium compound, if a stoichiometrically deficient amount of amine salt, dissolved in an organic solvent, is reacted with a highly excessive amount of cadmium, dissolved in a 45% phosphoric acid, by extraction. Quantitative conclusions can be drawn from these tests on the molar association of cadmium amine salt. From the multiplicity of investigated amines, the following molar occupation number per mol of cadmium arises:

| Amine salt | Molar amine salt required per mol of cadmium |
| --- | --- |
| primary amine/HCl salt | 5 to 7 |
| secondary amine/HCl salt | 5 to 10 |
| tertiary amine/HCl salt | 5 to 7 |

When operating with the process of the invention, selection of the useful amines takes place by way of three criteria:

(a) dissolving properties of the amine salts in the organic solvent for producing the organic phase (b) specific extraction behavior over the cadmium-containing acids (c) separation behavior of the two extraction phases in the performance of the process.

The primary, secondary and tertiary amines are required to have an alkyl radical with a carbon atomic number of between 8 and 30, especially between 8 and 18. The solubility of the amine salts in the organic solvents is dependent on the length of the alkyl radical and on the number of the alkyl radicals in the amine molecule. Some amine salts, during extraction, result in the formation of emulsions thereby delaying separation of the phases. The tendency to form emulsions was especially noted with some long-chain primary and secondary amines. When using tertiary amines, such a formation of emulsion was not observed.

However, the formation of emulsions does not depend alone on the type of amines; it is rather a consequence of the cooperation of a large number of factors, such as, e.g. the type of the organic solvent, the viscosity of the aqueous phase and the intensity and type of phase mixture when extraction is performed. By use of preliminary tests it will have to be found out from time to time what amine salt solutions are suitable for the performance in what organic solvents.

Production of the reagent is done in a manner that the halogen hydracid is added to the free amine. That procedure can be performed externally of the process course in that a predetermined amount of amine at the molar ratio of 1:1 of amine nitrogen to halogen hydrogen is reacted with a corresponding amount of halogen hydracid and the resultant salt isolated while dissolving the same in case of need in the organic solvent.

The production of the reagent also can be performed in that the amine is dissolved in an organic solvent and the thus obtained solution is placed into contact with an aqueous, diluted halogen hydracid by intensive mixing, with the reagent forming in the organic solvent and being present therein in dissolved form. This way of preparing the reagent is performed by way of an extraction process. This is the preferred way of performance when the process of the invention is worked continuously, with the organic solvent being circulated with the reagent via the process steps.

The process of the invention is carried out with organic solvents that will have to fulfill the following conditions:

They must not be mixable with water, aqueous salt solutions or with aqueous acids. Non-mixability with acids must still be safeguarded in high concentration ranges of acids. Conversely, the organic solvents must not absorb the aforementioned substances such as water, aqueous salt solutions or aqueous acid.

The organic solvents must be of a sufficient solubility for the amines, for the hydrogen halides of the amines and for the cadmium compound of the amine salt. The organic solvents must be inert over the medium to be extracted and the chemicals used for this. They must not react with those substances as such.

Under consideration of the foregoing criteria of selection, the following groups of organic solvents have proved to be useful of the inventive process:

(a) aliphatic hydrocarbons in the form of defined compounds, in mixtures or distillation fractions, (b) aromatic hydrocarbons in the form of defined compounds, in mixtures of aromatics or in mixtures of aliphatic hydrocarbons, (c) halogen-hydrocarbons in the form of defined aliphatic and/or aromatic compounds or in mixtures with the aforementioned solvents, (d) moreover, all other solvents or solvent-mixtures not referred to can be used provided that they fulfil the aforementioned criteria of selection.

The organic solution is produced by dissolving the extraction reagent in the aforementioned organic solvent. Usually, the process of the invention is worked with organic solutions having concentrations of between 0.1 and 10 percent by weight, preferably between 0.2 and 3.0 percent by weight of reagent.

In the production of higher-percentage, organic solutions, especially in the use of non-polar organic solvents, it is advisable to mix the organic solution to be produced with small amounts of solubilizers.

Materials not changing the dissolving properties of the organic solution over the aqueous acids or aqueous salt solutions but increasing the solubility of the extraction reagent and the cadmium compound thereof in the organic solvent, are used as solubilizers. Alcohols have proved to be suitable solubilizers. Long-chain, aliphatic alcohols in the form of pure compounds, isomeric mixtures or distillation fractions, such as octanols, decanols etc., have been used. Equally suitable for use as solubilizers are aromatic alcohols, such as benzyl alcohol. The amount of solubilizer is in the order of between 2 and 10 percent by weight, based on the organic solution. The amount and type of solubilizer to be used have to be determined from time to time by tests with the corresponding amines and organic solvents.

It is advisable to work the process of the invention preferably with such long-chain amines and such organic solvents and reagent concentrations that permit foregoing the use of solubilizers.

The process of the invention, usually, is run at normal temperatures, i.e. in a corresponding range of temperature of between 15° and 25° C. However, it can also be carried out without limitation at higher temperatures if so required by the respectively prevailing conditions. Also it will be possible to work in a range of temperature of between 60° and 80° C. The upper temperature limit is determined by the type of the organic solvent and the vapor pressure thereof, while the lower temperature limit is determined by the viscosity behavior of the two liquid phases. A heavy rise in viscosity will result in disturbances in mixing and separating the phases and hence in a breakdown of the extraction process.

After performance of the extraction process, the cadmium is enriched in the separated organic phase, from which the metal ion is removed by a re-extraction process. The re-extraction is performed with a neutrally to slightly acidly reacting aqueous solution adapted to consist of saline solutions or of water with no increased saline content. During performance of the re-extraction, the cadmium compound of the amine salt of the halogen hydracid is split. The cadmium migrates from the organic phase along with a more or less high percentage of the halogen hydracid into the aqueous phase which will result in a decreased pH-value in the course of re-extraction.

When using water as the re-extraction agent, the pH value considerably decreases as the buffering effect of the dissolved salt is missing. The re-extraction is required to be performed with relatively high amounts of liquid resulting in that a relative diluted cadmium extract is obtained.

When using salt-containing aqueous solutions, the pH-value does not substantially decrease, especially when using such saline solutions in which a buffer system is formed between the split-off halogen hydracid and the dissolved salt in the aqueous phase. Feasibly, high-percentage salt solutions should, if possible, be used for re-extraction. The separation of the phases takes place within short periods of time. The volume of the heavy phase can be kept small. After correction of the pH-value in the isolated heavy phase, the same can be re-used for re-extraction. In this way of operation, relatively small volume parts of a relatively high-concentrated cadmium salt solution are obtained. Feasibly, a part of the cadmium-containing heavy phase should be continuously discharged from the re-extraction cycle and be replaced by a corresponding amount of fresh salt solution. This will safeguard a constant composition of the re-extract.

The soluble alkaline and/or ammonium salts of oxygen acids are suitable for the production of the salt-containing aqueous phase. The salts of the oxygen acid are not allowed to form insoluble compounds during performance of the re-extraction. The aqueous solutions of the alkaline and/or ammonium salts of sulphuric acid, nitric acid, phosphoric acid or acetic acid reacting in neutral to weakly acid way, have proved to be suitable. Preferably, ammonium salts of the aforementioned oxygen acids are used as re-extraction agents, since the presence of ammonium ions in the aqueous re-extraction phase will counteract the precipitation of insoluble cadmium compounds. The upper limit of the salt content in the aqueous solutions acting in neutral to weakly acid manner is determined by the solubility of the salts.

After re-extraction, the cadmium-free organic phase has given off a certain amount of the amine salt forming anions to the aqueous phase. In the organic phase, a part of the dissolved amine is available as a free base. In order that the organic phase can be re-used for the extraction of cadmium it will be imperative to completely convert the amine contained in the organic phase into the salt of the halogen hydracid.

The salt formation takes place in the organic phase and is attained by intensive mixing with an aqueous halogen hydracid. The amount of acid absorbed from the aqueous phase corresponds to the stoichiometric amount required for the salt formation. After separation of the phase, the isolated organic phase is re-usable for the extraction of cadmium.

Feasibly, a diluted, aqueous halogen hydrogen acid should be used for the salt forming reaction. In practice, aqueous solutions of concentrations of 0.1 to 3.0 mol/l, preferably 0.1 to 1.0 mol/l, have proved to be suitable, it being advantageous to have the aqueous acid react in the multiphase counter-current with the amine-containing organic phase.

The aqueous halogen hydracid phase after reaction with the amine in the organic phase is refreshed by such amounts of new halogen hydracid that it is re-usable for the amine salt formation in the organic phase.

Moreover, it was surprizing to the one skilled in the art that the inventive process envolves such a high selectivity for cadmium ions. Other cations during extraction remain in the aqueous acid phase in the form of dissolved salts. Separation of cadmium from the other polyvalent cations is attained thereby.

The selectivity for cadmium is shown by the comparison set out in the following two Tables. The first Table sets forth the compositon of phosphoric acids of different $P_2O_5$ concentrations, mixed with cadmium and other cations.

Specified in the second Table is the composition of the same phosphoric acid after performance of a one-stage extraction with an organic phase of a 2% amine salt concentration at a phase ratio of 1:1 (parts by weight).

| Composition of the Phosphoric Acids prior to Extraction | | | | | | |
|---|---|---|---|---|---|---|
| $P_2O_5$ % | Cd ppm | Zn ppm | Co ppm | Ni ppm | Cu ppm | $Fe^{III}$ ppm | $U^{IV}$ ppm |
| 30 | 1050 | 10 000 | 11 700 | 10 000 | 9 400 | 9 900 | 200 |
| 40 | 1050 | 10 000 | 11 700 | 10 000 | 9 400 | 9 900 | 200 |
| 50 | 1050 | 10 000 | 11 700 | 10 000 | 9 400 | 9 900 | 200 |

| Composition of the Phosphoric Acids after Extraction | | | | | | |
|---|---|---|---|---|---|---|
| $P_2O_5$ % | Cd ppm | Zn ppm | Co ppm | Ni ppm | Cu ppm | $Fe^{III}$ ppm | $U^{IV}$ ppm |
| 30 | 410 | 10 000 | 11 700 | 10 000 | 9 400 | 9 900 | 195 |
| 40 | 370 | 10 000 | 11 600 | 10 000 | 9 500 | 10 000 | 202 |
| 50 | 350 | 10 000 | 11 700 | 10 000 | 9 400 | 10 000 | 200 |

It has been established that despite of the excess of every other cation over the cadmium in the phosphoric acids, no noteable changes except for cadmium, have been caused by the extraction in connection with the aqueous acid phase.

Applying the extraction to filter acids produced according to the wet process shows that the process according to the invention, without limitation, can be applied thereto. This is a surprizing result as the filter acids, in addition to sulphuric acid, hydrofluoric acid and silica hydrogen fluoride acid, also contain high amounts of various dissolved metal salts. The content of such metal ions, in its entirety, is in the order of the 1000 L to 2000-fold excess, based on the cadmium contained therein. Accordingly, the one skilled in the art could not expect trouble-free extraction of the cadmium in the presence of such an excessive amount of most various metal ions. The tests were conducted with four filter acids produced from the most different crude phosphate ores. The following Table shows the selection and composition of the filter acids:

| Origin of crude phosphoric acid | Composition | | | Based on $P_2O_5$ | | Ratio Cd/ Overall cations (mval) |
|---|---|---|---|---|---|---|
| | $P_2O_5$ | Overall cations (mval) | Cd ppm | Overall cations (mval) | Cd (mval) | |
| Morocco | 29.9 | 57.4 | 15.5 | 192 | 0.093 | 1:2065 |
| Togo | 26.8 | 58.1 | 25.8 | 209 | 0.166 | 1:1260 |
| Florida I | 30.0 | 132.9 | 6.6 | 443 | 0.039 | 1:11359 |
| Florida II | 29.0 | 164.2 | 4.3 | 608 | 0.029 | 1:20966 |

The extractions were performed in one stage at a phase ratio of 1:1 (parts by weight) with an organic 2% amine salt solution. The remaining cadmium content was determined in the extracted filter acid. The result have been summarized in the Table.

| Filter acid (origin) | Cd-Content | | Depletion % of charge % |
|---|---|---|---|
| | before ppm | after ppm | |
| Morocco | 15.5 | 0.3 | 98 |
| Togo | 25.8 | 0.5 | 98 |
| Florida I | 6.6 | 0.3 | 96 |
| Florida II | 4.3 | 0.3 | 94 |

The applicability of the process by no means is restricted to phosphoric acids. It has been found by way of tests that cadmium can also be removed from mixtures of phosphoric acids with other mineral acids. It has been established that the process of the invention is applicable with an equally satisfactory result to mixtures of phosphoric acid with sulphuric acid, hydrofluoric acid, silica hydrogen fluoride acid, nitric acid and other halogen hydracid.

With the exception of nitric acid, the other mineral acids admixed thereto do not cause a change in the course of extraction as represented by the test results from the pure phosphoric acids. With mixtures of phosphoric acid and the nitric acid, a satisfactory extraction of cadmium will be possible only if the $P_2O_5$ concentration therein is in excess of 40% and the $HNO_3$ concentration is lower than 5%.

The process of the invention is applicable also to other phosphate free, acid, cadmium-containing metal salt solutions. In the operation of cationic exchanger plants in galvanizing or other metal refining processes, acid cationic exchanger regenerates are periodically obtained containing, in enriched form, the dissolved metal salts in excessive acid. The regenerates obtained as a rule, consist of a metal salt solution containing free sulphuric acid in amounts of between 4 and 6% and having a metal ion content of between 0.6 and 1.0 val/l. The thus obtained cationic exchanger regenerates are decontaminated in that the dissolved metals are precipitated as insoluble hydroxides or basic salts by the addition of alkaline-reacting substances. If the acid regenerates contain cadmium-ions, decontamination envolves difficulties, for, cadmium can be precipitated only at a pH-value of above 9. With a pH-value of 8.5, approximately 4.5 mg/l cadmium will still remain as a dissolved salt in the decontaminating charge thus requiring a higher alkalization. However, by that requirement, the permitted pH-value range for purified wastewater being in the range of pH 6.5 and pH 9.0, is exceeded.

The difficulties envolved with decontamination of cadmium-containing acid concentrates will be overcome if the same are treated according to the inventive process and the cadmium is removed from the concentrates by extraction.

In the zinc recovery from sulfidic ores the separation of cadmium from zinc is a particularly complex operation. This especially applies to the production of the sulfuric zinc salt solution for electrolytically separating the zinc. According to the usual way of operation, the dissolved cadmium is precipitated by carburization with metallic zinc, from the acid zinc solution.

Owing to the high selectivity of the process according to the invention for cadmium ions, it is possible for the process to be used for depleting cadmium ions from the sulfuric zinc electrolyte. In particular, it is advantageous to work the process in the form of a multi-phase counter-current extraction.

The process can be used with equal success for the regeneration of used-up cadmium electrolytic solutions. The metallic cadmium is equally recovered by electrolysis from the weakly acid cadmium sulfate solution. For reasons of current efficiency, electrolysis is performed to such an extent until the cadmium content has been reduced to values of between 0.18 and 0.27% and the sulfuric acid content has increased to values of between 12.5 and 14.0%. These worked off electrolytes represent a diluted sulphuric acid. It is only to a limited extent that they can be recirculated into the production process.

Efforts have, therefore, been taken to find a suitable possibility of application for the said sulphuric acid containing cadmium and other metal salts. Some processors have been trying to add the worked-off electrolytes, to a certain extent, to the fresh cadmium sulfate lyes in order to have a higher free acid share in the electrolytes. Others have precipitated the cadmium by the addition of metallic zinc; however, in that way of operation, no cadmium-free sulphuric acid is obtained.

WIth the aid of the process according to the invention, it is possible to recover from the worked-off cadmium electrolytes cadmium-free diluted sulphuric acids that can be readily further processed.

The process of the invention can be used for removing cadmium from sulphuric acid of a concentration of up to 60% $H_2SO_4$. Hence, acids recovered according to the lead-chamber process and, from the roaster gases, having a low cadmium content, by way of extraction can be freed from the dissolved cadmium.

EXAMPLE 1

A phosphoric acid produced according to the wet process from Togo phosphate ore, fined and reconcentrated, had the following data of analysis:
$P_2O_5 = 52.6\%$
$H_2SO_4 = 4.4\%$
$HF = 0.7\%$
$Fe = 1.1\%$
$Al = 0.5\%$
$Cr = 0.2\%$
$Mg = 0.09\%$
$Cu = 0.01\%$
$Cd = 60$ ppm For the removal of cadmium, the acid over the time span of one week, in a four-stage liquid/liquid counter-current extraction system of the mixer-settler type, was treated with an organic phase of the following composition:
49.0% xylol
49.0% aliphatic hydrocarbon (boiling point: 200°–240° C.)
2.0% HCl salt of the tridodecyl amine The extraction was performed at a phase ratio of 1:3 (parts by weight organic phase to parts by weight aqueous phase). After separation of the phases, the organic phase was treated with an aqueous solution consisting of a 10% diammonium sulfate solution at a phase ratio of 10:1 (parts by weight of organic phase to parts by weight of aqueous phase) in continuous form in a three-stage liquid/liquid counter-current extraction system of the mixer-settler type.

The organic phase from the re-extraction stage was continuously treated in a third two-stage liquid/liquid counter-current extraction system of the mixer-settler type, with a 2.0% hydrochloric acid solution at a phase ratio of 10:1 (parts by weight organic phase to parts by weight aqueous phase). The outgoing organic phase was continuously recirculated as a light phase into the extraction stage of the process. The outgoing aqueous solution was refreshed with concentrated hydrochloric acid and re-used for the salt formation of the amine contained in the organic phase.

When all stages of the process were in stationary condition, the following data of analysis were measured in outgoing aqueous phases:
Outgoing, treated phosphoric acid:
$P_2O_5 = 52.6\%$
$H_2SO_4 = 4.4\%$
$HF = 0.7\%$
$Fe = 1.1\%$
$Al = 0.5\%$
$Cr = 0.2\%$
$Mg = 0.09\%$
$Cu = 0.01\%$
$Cd = <1$ ppm
Outgoing aqueous re-extraction solution:
$SO_3 = 6.05\%$
$Cl = 0.81\%$
$P_2O_5 = 0.90\%$ Cd=0.18%
NH$_3$=2.58%
Outgoing aqueous diluted hydrochloric acid:
HCl=1.10%
SO$_3$=0.10%
P$_2$O$_5$=0.01%

The aqueous re-extraction solution obtained that contained the whole of the cadmium from the phosphoric acid, was neutralized by the charge with a 10% soda solution, the cadmium precipitated as carbonate, filtered off and deposited. The outgoing filtrate had a pH-value of 10.2, the Cd-content was <1 ppm.

EXAMPLE 2

A filter acid produced according to the wet process from Morocco phosphate ore and whose HF and As content was lowered by after-treatment for the production of dicalcium phosphates, contains 30.3% P$_2$O$_5$
17 ppm Cd From that acid the existing cadmium was continuously extracted and further processed in the way of operation as described in Example 1. As opposed to Example 1, a solution composed of 98.4% xylol
1.6% diisononyl hydrochloride was used as the organic phase for the extraction of cadmium. The extraction was performed at a phase ratio of 1:10 (parts by weight organic phase to parts by weight aqueous phase). After extraction, the cadmium content with otherwise unchanged analyses of the acid, was lowered to 0.5 ppm.

EXAMPLE 3

In a chemo-technical process, a solution containing acid phosphate salt is continuously obtained as a by-product, which solution, among others, contains the following substances:

P$_2$O$_5$=32.5%
H$_2$SO$_4$=12.1%
HF=1.1%
Na=2.2%
Mg=2.3%
Ca=0.4%
Al=1.2%
Fe=1.3%
Cr=0.2%
Cd=130 ppm The cadmium was continuously removed by extraction from this acid phosphate salt solution by way of the technical apparatus as described in Example 1. In deviation from the data indicated in Example 1, a solution was used as the organic phase that was composed of 94.0% aliphatic hydrocarbon (boiling point: 100°-140° C.)
3.0% decanol
3.0% HCl salt of the triisononyl amine.

The extraction was performed at a phase ratio of 1:1 (parts by weight).

Re-extraction of the cadmium from the organic phase was performed in coutner-current with a 10% disodium sulfate solution at a phase ratio of 5:1 parts by weight organic phase to parts by weight aqueous phase.

After attaining equilibrium condition, the decadmized acid phosphate salt solution had the following analysis data:

P$_2$O$_5$=32.3%
H$_2$SO$_4$=11.9%
HF=1.1%
Na=2.2%
Mg=2.3%
Ca=0.4%
Al=1.2%
Fe=1.3%
Cr=0.2%
Cd=1 ppm The cadmium-containing re-extraction solution was worked in accordance with the method as described in Example 1 in that the dissolved cadmium was precipitated as carbonate and filtered off. Approximately 50% of the cadmium-free filtrate obtained were branched off from the filtrate amount for producing a fresh aqueous re-extraction solution. The salt load of the preflooder was thus decreased by 50 percent and the operating costs of the process were reduced.

What is claimed is:

1. A process for the selective extraction of cadmium ion from a P$_2$O$_5$-containing acid solution comprising the steps of:
   (a) providing a first aqueous phase comprising an aqueous acid solution containing an amount of cadmium ion;
   (b) contacting said first aqueous phase with an organic phase comprising an organic solvent and a hydrogen halide salt of amine containing an alkyl radical of between about 8 and about 30 carbon atoms in length, said amine being selected from the group consisting of a primary amine, a secondary amine, and a tertiary amine, whereby cadmium ion is extracted from said first aqueous phase into said organic phase;
   (c) thereafter separating said organic phase from said first aqueous phase; and
   (d) contacting said organic phase with a second aqueous phase comprising one selected from the group consisting of a saline solution and water to extract cadmium ion from said organic phase into said second aqueous phase.

2. A process as in claim 1, wherein:
   (i) said aqueous acid solution further contains at least one metal ion species other than cadmium ion; and
   (ii) cadmium ion is selectively extracted from said first aqueous phase during step (b), such that the concentration of said metal ion species other than cadmium ion is substantially unaltered after step (b) is completed.

3. A process as in claim 1, wherein said amount of cadmium ion in said first aqueous phase in step (a) is a trace amount.

4. A process as in claim 3, wherein said aqueous acid solution comprises an acid phosphate.

5. A process as in claim 3, wherein said aqueous acid solution comprises phosphoric acid.

6. A process as in claim 1, wherein said organic solvent is immiscible with aqueous acid solutions.

7. A process as in claim 1, wherein said organic phase further comprises a solubilizer for said hydrogen halide salt.

8. A process as in claim 1, wherein said hydrogen halide salt is an amine salt of hydrochloric acid, hydrobromic acid, or hydroiodic acid.

9. A process as in claim 1, wherein said amine is a tertiary amine.

10. A process as in claim 1, wherein said alkyl radical is between about 8 and about 18 carbon atoms in length.

11. A process as in claim 1, wherein said hydrogen halide salt is present in said organic phase in the range between about 0.2% and about 3.0% by weight.

12. A process as in claim 1, wherein said second aqueous phase comprises an aqueous solution of a salt of an oxygen acid.

13. A process as in claim 10, wherein said salt of an oxygen acid comprises an ammonium salt.

14. A process as in claim 10, wherein the concentration of said salt of an oxygen acid in said aqueous solution ranges between about 0.1 and about 1.0 mol/l.

15. A process as in claim 1, wherein said second aqueous phase consists of water.

16. A process as in claim 1, wherein said second aqueous phase has a pH between about 2 and about 7.

17. A process as in claim 5, wherein said aqueous acid solution further comprises an acid selected from the group consisting of hydrofluoric acid, sulfuric acid, and silica hydrogen fluoride acid.

18. A process as in claim 5, wherein said aqueous acid solution further comprises nitric acid, the concentration in said aqueous acid solution of $P_2O_5$ and nitric acid being in excess of 40% and less than 5%, respectively.

19. A process as in claim 1, further comprising the steps after step (d) of:
(e) converting amines in said organic phase into the corresponding hydrogen halide salts; and then
(f) repeating steps (a) through (d), using the organic phase from step (e) as said organic phase.

20. A process as in claim 19, wherein step (e) comprises contacting said organic phase with an aqueous solution of a halogen hydrogen acid.

* * * * *